United States Patent
Wada et al.

(10) Patent No.: US 9,136,058 B2
(45) Date of Patent: *Sep. 15, 2015

(54) LAMINATED CERAMIC ELECTRONIC COMPONENT AND MANUFACTURING METHOD THEREFOR

(71) Applicant: MURATA MANUFACTURING CO., LTD., Nagaokakyo-shi, Kyoto-Fu (JP)

(72) Inventors: Hiroyuki Wada, Nagaokakyo (JP);
Yosuke Hirata, Nagaokakyo (JP);
Takashi Hiramatsu, Nagaokakyo (JP);
Yoshito Saito, Nagaokakyo (JP);
Hideaki Tsuji, Nagaokakyo (JP);
Hiroyuki Ukai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/858,989

(22) Filed: Apr. 9, 2013

(65) Prior Publication Data

US 2013/0222973 A1   Aug. 29, 2013

Related U.S. Application Data

(63) Continuation of application No. PCT/JP2011/075651, filed on Nov. 8, 2011.

(30) Foreign Application Priority Data

Nov. 24, 2010   (JP) ................ 2010-260792

(51) Int. Cl.
*H01G 4/30* (2006.01)
*H01G 4/005* (2006.01)
*H01G 4/12* (2006.01)

(52) U.S. Cl.
CPC ............ *H01G 4/30* (2013.01); *H01G 4/005* (2013.01); *H01G 4/12* (2013.01); *H01G 4/1218* (2013.01)

(58) Field of Classification Search
CPC ....... H01G 4/0085; H01G 4/005; H01G 4/30; H01G 4/1218; H01G 4/12; H01G 4/008
USPC .................... 361/303, 321.2, 301.4
See application file for complete search history.

(56) References Cited

U.S. PATENT DOCUMENTS 5,196,757 A * 3/1993 Omatsu ............. 310/358
7,158,364 B2 * 1/2007 Miyauchi et al. ........ 361/303

(Continued)

FOREIGN PATENT DOCUMENTS

CN   101559444 A   11/2009
JP   06267785 A   9/1994

(Continued)

OTHER PUBLICATIONS

Machine Translation of JP06-267785A published in 1994.*
PCT/JP2011/075651 Written Opinion dated Jan. 25, 2012.

*Primary Examiner* — David M Sinclair
(74) *Attorney, Agent, or Firm* — Arent Fox LLP

(57) ABSTRACT

A laminated ceramic capacitor including a laminated body having a plurality of stacked ceramic layers and internal electrodes located between the ceramic layers. The internal electrodes have a plurality of ceramic columnar members formed therein, which project into the internal electrodes from interfaces between the ceramic layers and the internal electrodes, but do not penetrate in the thickness direction of the internal electrodes.

16 Claims, 4 Drawing Sheets

(56) References Cited

U.S. PATENT DOCUMENTS

| | | | |
|---|---|---|---|
| 8,102,639 B2* | 1/2012 | Kasuya et al. | 361/305 |
| 8,343,385 B2* | 1/2013 | Kim et al. | 252/513 |
| 8,540,832 B2* | 9/2013 | Hirata et al. | 156/89.11 |
| 8,609,564 B2* | 12/2013 | Matsuda et al. | 501/139 |
| 2007/0074806 A1 | 4/2007 | Kojima et al. | |
| 2009/0256666 A1 | 10/2009 | Noma et al. | |
| 2011/0110014 A1* | 5/2011 | Hirata et al. | 361/301.4 |

FOREIGN PATENT DOCUMENTS

| | | | |
|---|---|---|---|
| JP | 2001-110233 A | 4/2001 | |
| JP | 2004-111698 A | 4/2004 | |
| JP | 2007-103453 A | 4/2007 | |
| JP | 4276642 B2 | 6/2009 | |
| WO | WO 2010146967 A1 * | 12/2010 | |

* cited by examiner

LAMINATED CERAMIC ELECTRONIC COMPONENT AND MANUFACTURING METHOD THEREFOR

CROSS REFERENCE TO RELATED APPLICATIONS

The present application is a continuation of International application No. PCT/JP2011/075651, filed Nov. 8, 2011, which claims priority to Japanese Patent Application No. 2010-260792, filed Nov. 24, 2010, the entire contents of each of which are incorporated herein by reference.

FIELD OF THE INVENTION

This invention relates to a laminated ceramic electronic component and a method for manufacturing the laminated ceramic electronic component, and in particular, relates to the structure of an internal electrode included in a laminated ceramic electronic component.

BACKGROUND OF THE INVENTION

Examples of laminated ceramic electronic components include laminated ceramic capacitors. The increased electrostatic capacitance per unit volume, that is, the ability to acquire higher capacitance in spite of being smaller in size is desired for laminated ceramic capacitors in the case of using the capacitors as surface-mounted components. In order to enhance the reduction in size and the increase in capacitance, it is typically effective to enhance the reduction in layer thickness for each of ceramic layers and internal electrodes, and the increase in the number of the internal electrodes located between the ceramic layers.

However, the increased number of the layers increases the ratio of the internal electrodes per unit volume of the laminated ceramic capacitor. As a result, the difference in the temperature of sintering shrinkage in a firing step between the ceramic layer section and the internal electrode section has a significant influence, which makes delamination likely to be caused.

In addition, the ceramic constituting the ceramic layer section and the metal constituting the internal electrode section are different from each other in coefficient of thermal expansion. Therefore, the laminated ceramic capacitor obtained through the firing step has internal stress caused by the difference in coefficient of thermal expansion. This internal stress is further increased as the ratio of the internal electrodes is increased by the increase in the number of layers, and thus is a cause of making cracks likely to be caused when thermal stress (thermal shock) is applied.

In order to solve these problems, for example, Japanese Patent Application Laid-Open No. 2004-111698 (Patent Document 1) discloses glass phases extending in a columnar fashion in the thickness direction of internal electrodes, which are distributed in scraps. This configuration will be described in more detail with reference to FIG. 7. FIG. 7 is a cross-sectional view illustrating a partial enlargement of a laminated body 4 to serve as a component main body of a laminated ceramic capacitor.

The laminated body 4 has a stacked structure including a plurality of ceramic layers 2 stacked and internal electrodes 3 located between the ceramic layers 2. The internal electrodes 3 mainly include a metal sintered body 6, and have several voids 7 observed, while columnar glass phases 8 extending in a columnar fashion in the thickness direction are distributed in scraps in the internal electrodes 3.

The glass phases 8 are formed in the firing process for obtaining the laminated body 4. When a glass component is contained in a conductive paste for the internal electrodes 3, a glassy substance is deposited in the internal electrodes 3 and at the interface section between the internal electrodes 3 and the ceramic layers 2 in the process of firing, and this deposited glassy substance partially forms the columnar glass phases 8.

The glassy substance deposited as described above suppresses the shrinkage of the internal electrodes 3, reduces thermal stress at the interfaces between the internal electrodes 3 and the ceramic layers 2, and makes the internal electrodes 3 and the ceramic layers 2 likely to slide on each other at the interfaces. Thus, stress which causes delamination can be relaxed to make structural defects such as delamination and cracking less likely to be caused.

However, the technique described in Patent Document 1 forms the columnar glass phases 8 so as to penetrate in the thickness direction of the internal electrodes 3, and thus causes the internal electrodes 3 to be broken off at least in the sections with the columnar glass phases 8 present. As a result, in the case of the laminated ceramic capacitor, situations are caused against the demand for the increase in capacitance, such as leading to a reduction in electrostatic capacitance.

While the laminated ceramic capacitor has been described above, laminated ceramic electronic components other than laminated ceramic capacitors can also encounter similar problems.

Patent Document 1: Japanese Patent Application Laid-Open No. 2004-111698

SUMMARY OF THE INVENTION

Therefore, an object of this invention is to provide a laminated ceramic electronic component and a method for manufacturing the laminated ceramic electronic component, which prevents any decrease in performance due to breaking-off of internal electrodes from being caused, and can make structural defects such as delamination and cracking less likely to be caused even when the reduction in layer thickness is enhanced for ceramic layers and internal electrodes, and when the increase in the number of the layers is enhanced.

This invention is first directed to a laminated ceramic electronic component including a laminated body having a plurality of ceramic layers stacked and internal electrodes located between the ceramic layers. Further, in order to solve the technical problem described above, a plurality of columnar members made of a ceramic are formed in the internal electrodes. These columnar members characteristically have base ends located at interfaces between the ceramic layers and the internal electrodes, have tips located in the internal electrodes, and do not penetrate in the thickness direction of the internal electrodes.

More specifically, the columnar members meet the following conditions when an observation is made by an observation method of making an observation with the use of an electron microscope while focusing on a polished cross section obtained by polishing the laminated body in the stacking direction, with the internal electrodes exposed at the cross section and then dissolved and removed by chemical etching.

(1) The columnar members have base ends joined with the ceramic layers, and have tips located in the range of 20% or more and 90% or less of the thickness of the internal electrode, with the joints between the base ends and the ceramic layers as base points.

(2) The columnar member has a width of 0.8 µm or less in 50% or more of the section from the base end to the tip.

(3) The columnar members are present at a rate of one or more per 10 µm in length in the section for each existence of the internal electrodes.

In the laminated ceramic electronic component according to this invention, ceramic penetrating members penetrating through the internal electrodes can also be further formed in the internal electrodes. In this case, when an observation is made by the observation method described above, the ratio of the area occupied by the penetrating members to area occupied by the internal electrodes is preferably 3% or less in terms of stable retention of performance such as electrostatic capacitance.

In addition, the main constituent of the columnar members and the main constituent of the ceramic layers are preferably both a barium titanate-based compound.

In addition, the main constituent of the internal electrodes is preferably nickel.

This invention is also directed to a method for manufacturing the laminated ceramic electronic component. The laminated ceramic electronic component described above can be manufactured by this manufacturing method, for example.

A method for manufacturing a laminated ceramic electronic component according to this invention includes a step of preparing an unfired laminated body including a plurality of unfired ceramic layers stacked and conductive paste films to serve as internal electrodes, which are located between the unfired ceramic layers; and a firing step of making the unfired laminated body sintered, wherein a conductive paste for constituting the conductive paste films mentioned above contains a ceramic powder, and the firing step includes a step of carrying out a heat treatment in accordance with a temperature profile at an average rate of temperature increase of 40° C./sec or more from room temperature to a maximum temperature.

In the method for manufacturing a laminated ceramic electronic component according to this invention, the ceramic powder contained in the conductive paste preferably has an average particle size of 0.2 µm or less. It is to be noted that the average particle size in this specification refers to an average obtained by converting a SEM observation image of the powder into spherical shapes and averaging the values of the particle sizes.

The laminated ceramic electronic component according to this invention has a plurality of columnar members distributed in the internal electrodes, and can thus relax thermal stress between the internal electrodes and the ceramic layers as in the case of the technique described in Patent Document 1. In addition, since the columnar members act as spikes driven in the internal electrodes while extending from the interfaces between the ceramic layers and the internal electrodes, the joints between the ceramic layers and the internal electrodes are reinforced by the columnar members in addition to interactions at the interfaces. Therefore, the laminated ceramic electronic component can be improved in thermal shock resistance.

Thus, structural defects such as delamination and cracking can be made less likely to be caused in the laminated ceramic electronic component. As a result, it becomes possible to promote the reduction in layer thickness for the ceramic layers and the internal electrodes and the increase in the number of internal electrodes, and the reduction in size and the increase in performance can be advantageously carried forward for the laminated ceramic electronic component. In particular, in the case of a laminated ceramic capacitor, the reduction in size and the increase in capacitance can be advantageously carried forward for the capacitor.

In addition, in the method for manufacturing a laminated ceramic electronic component according to this invention, the ceramic powder is added in the conductive paste for the internal electrode, and the sintering onset temperatures for the internal electrodes and the ceramic layers can be made close to each other. This also contributes to the ability to make structural defects such as delamination and cracking less likely to be caused after firing.

In particular, the columnar member as a characteristic feature of this invention is focused on not penetrating in the thickness direction of the internal electrodes. Therefore, the internal electrodes are relatively thinned in the sections with the columnar members present, but continuous without being broken off.

Accordingly, the formation of the columnar members keeps the decrease in the performance of the laminated ceramic electronic component to a minimum, and in particular, in the case of a laminated ceramic capacitor, the formation of the columnar members can avoid the decrease in electrostatic capacitance.

DETAILED DESCRIPTION OF THE INVENTION

Figure 1:
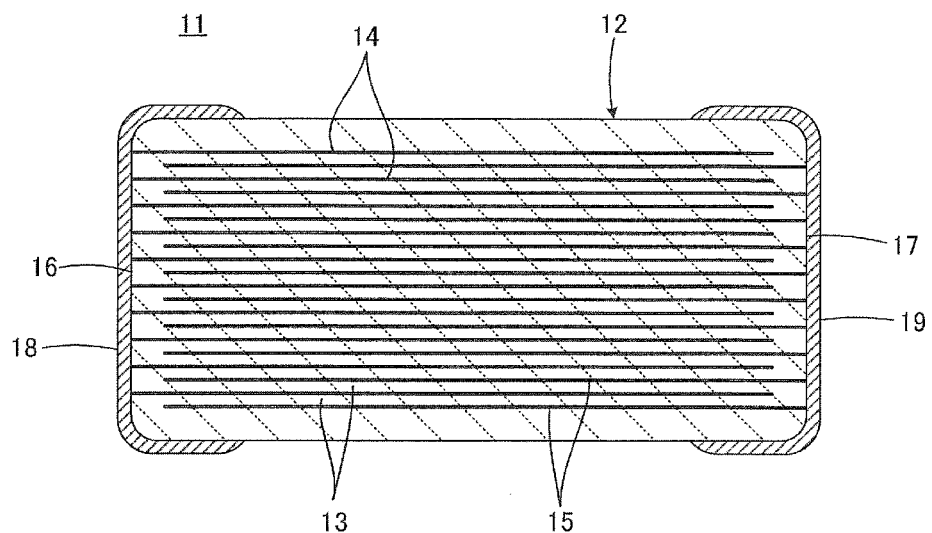
FIG. 1 is a cross-sectional view illustrating a laminated ceramic capacitor as an example of a laminated ceramic electronic component according to an embodiment of this invention.

The structure of a laminated ceramic capacitor 11 as an example of a laminated ceramic electronic component to which this invention is applied will be described with reference to FIG. 1.

The laminated ceramic capacitor 11 includes a laminated body 12 as a component main body. The laminated body 12 has a plurality of ceramic layers 13 stacked, and internal electrodes 14 and 15 located between the ceramic layers 13. The internal electrodes 14 and internal electrodes 15 are arranged alternately in the stacking direction. The pluralities of internal electrodes 14 and 15 have their respective ends exposed respectively at one and the other end surfaces 16 and 17 of the laminated body 12, and external electrodes 18 and 19 are formed so as to electrically connect the respective ends of the internal electrodes 14 to each other, and the respective ends of the internal electrodes 15 to each other.

Figure 2:
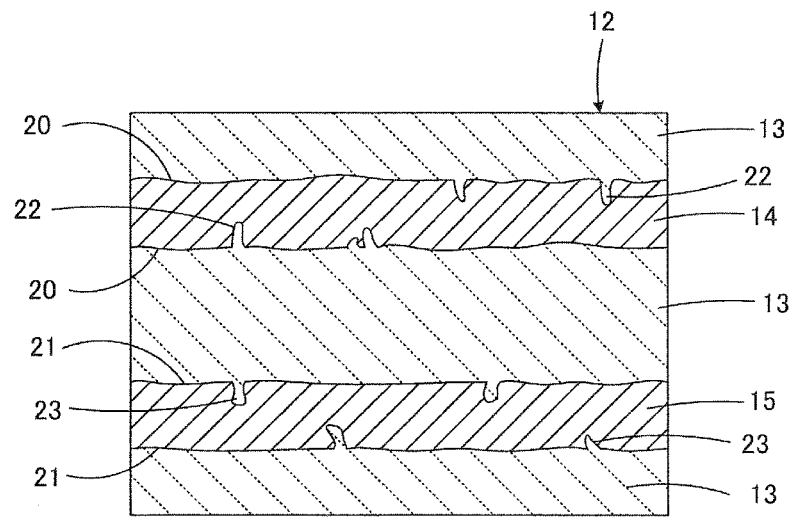
FIG. 2 is a cross-sectional view schematically illustrating enlarged internal electrodes of the laminated ceramic capacitor shown in FIG. 1.

The above-described internal electrodes 14 and 15 enlarged are schematically illustrated in FIG. 2. As illustrated in FIG. 2, in the internal electrode 14, a plurality of ceramic columnar members 22 are formed which project into the internal electrode 14 from an interface 20 between the ceramic layer 13 and the internal electrode 14. Likewise, in the internal electrode 15, a plurality of ceramic columnar members 23 are formed which project into the internal electrode 15 from an interface 21 between the ceramic layer 13 and the internal electrode 15. These columnar members 22 and 23 are distributed along the principal surfaces of the internal electrodes 14 and 15 respectively without penetrating in the thickness direction of the internal electrodes 14 and 15. It is to be noted that the definition of the columnar members 22 and 23 will be described later with reference to FIG. 3.

For manufacturing this type of laminated ceramic capacitor 11, first, ceramic green sheets to serve as the ceramic layers 13 are prepared, and conductive paste films to serve as the internal electrodes 14 and 15 are formed by printing on the ceramic green sheets. Next, an unfired laminated body to serve as the laminated body 12, which includes the plurality of unfired ceramic layers and the conductive paste films located between the unfired ceramic layers, is prepared by stacking the plurality of ceramic green sheets.

Then, a firing step is carried out for making the unfired laminated body sintered. Then, the external electrodes 18 and 19 are formed respectively on the end surfaces 16 and 17 of the sintered laminated body 12 to complete the laminated ceramic capacitor 11.

In order to make it possible to efficiently and reliably form the columnar members 22 and 23 described previously, first of all, a ceramic powder is contained in the conductive paste used for forming the conductive paste film to serve as the internal electrodes 14 and 15. This ceramic powder is preferably equal or close in composition to the ceramic constituting the ceramic layers 13, and for example, when the main constituent of the ceramic layers 13 is a barium titanate-based compound, the main constituent of the ceramic powder is also a barium titanate-based compound.

Secondly, in the firing step described above, a heat treatment step is carried out through the application of a temperature profile in which the average rate of temperature increase from room temperature to the maximum temperature is adjusted to 40° C./second or more. Preferably, the temperature profile is adjusted to 100° C./second or more. The firing step under this condition causes the ceramic constituting the ceramic powder contained in the conductive paste to move near the interfaces 20 and 21 between each of the internal electrodes 14 and 15 and the ceramic layers 13, and create the columnar members 22 and 23. In this case, for the more efficient generation of the columnar members 22 and 23, the ceramic powder preferably has an average particle size of 0.2 μm or less.

Since the columnar members 22 and 23 are generated in accordance with the mechanism described above, the columnar members 22 and 23 have substantially the same composition as the composition of the ceramic powder contained in the conductive paste. Therefore, as described previously, when the main constituent of the ceramic layers 13 is a barium titanate-based compound and the main constituent of the ceramic powder is a barium titanate-based compound, the main constituent of the columnar members 22 and 23 is also a barium titanate-based compound.

The application of the temperature profile in which the average rate of temperature increase from room temperature to the maximum temperature is adjusted to 40° C./second or more as described previously, substantially suppress the generation of a large secondary phase in the section of the ceramic layers 13, and this suppression, which reinforces the interfaces between the ceramic layers 13 and each of the internal electrodes 14 and 15, is effective for the suppression of cracking. Contrarily, if the columnar members 22 and 23 are formed as a part of a large secondary phase generated, the interfaces will not be reinforced between the internal electrodes 13 and each of the internal electrodes 14 and 15, and the effect of cracking suppression cannot be expected very much.

Further, as can be seen from an experimental example described later, when a temperature profile in which the average rate of temperature increase from room temperature to the maximum temperature is made slow to less than 40° C./second is applied in the heat treatment step in the firing step, columnar members are formed, while it is often the case that the formed columnar members will penetrate in the thickness direction of the internal electrodes 14 or 15.

On the other hand, it has been found from the experimental example described later that columnar members are less likely to be formed regardless of the rate of temperature increase in the heat treatment step, when the ceramic powder is not added to the conductive paste.

In the firing step, the unfired laminated body is preferably subjected to a degreasing treatment before the heat treatment step described above.

When the internal electrodes 14 and 15 contain, as a conductive component, a base metal such as Ni, the heat treatment step may be carried out in an atmosphere supplied with an atmosphere gas which is oxidative with respect to the equilibrium oxygen partial pressure of the base metal.

In addition, in the heat treatment step, cooling is preferably carried out immediately after reaching the maximum temperature mentioned above, without maintaining this temperature.

Figure 3:
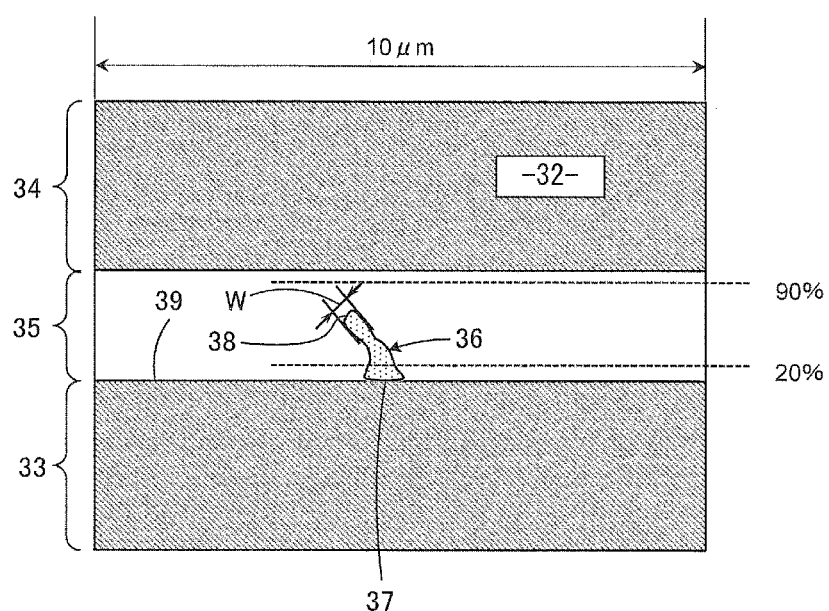
FIG. 3 is a cross-sectional view for explaining the definition of a columnar member as a feature of this invention.

The columnar members as a feature of this invention should be distinguished from simple projections. The definition of the columnar members will be clarified with reference to FIG. 3. FIG. 3 illustrates therein a polished cross section 32 obtained by polishing a laminated body 31 in the stacking direction. While ceramic layers 33 and 34 as well as the internal electrode located between the ceramic layers 33 and 34 are exposed in the polished cross section 32, the internal electrode is dissolved and removed by chemical etching, and an internal electrode track 35 is illustrated in FIG. 3.

FIG. 3 illustrates therein one columnar member 36, and this columnar member 36 is one observed by an observation method of making an observation with the use of an electron microscope while focusing on the polished cross section 32 as described above. It is to be noted that even when the columnar member is present deeper than the polished cross section 32, rather than on the polished cross section 32, the columnar member is counted as a columnar member or a candidate therefor, as long as the columnar member is found by the observation with the electron microscope.

The columnar member 31 illustrated has a base end 37 located at an interface 39 between the ceramic layer 33 and the internal electrode (internal electrode track 35 in FIG. 3), and a tip 38 located in the internal electrode (internal electrode track 35). More specifically, the columnar member 31 first has the base end 37 joined with the ceramic layer 33. On the other hand, the tip 38 is located in the range of 20% or more and 90% or less of the thickness of the internal electrode (internal electrode track 35), with the joint between the base end 37 and the ceramic layer 33 as a base point. This condition is considered as a first requirement for the columnar member.

Next, the width W of the columnar member 31 is 0.8 μm or less in 50% or more of the section from the base end 37 to the tip 38. This is considered as a second requirement for the columnar member. It is to be noted that the width W of the columnar member 31 is supposed to be a dimension measured in a direction orthogonal to the central axis line of the columnar member 31, as illustrated in FIG. 3. In terms of stable retention of electrostatic capacitance acquired, the width W of the columnar member 31 is preferably smaller, and for example, more preferably 500 nm or less.

Furthermore, the columnar member 31 is present at a rate of one or more per 10 μm in length in the section for each existence of the internal electrodes (internal electrode track 35).

It is to be noted that, although not illustrated, ceramic penetrating members penetrating through the internal electrodes can be further formed in the internal electrodes. In this case, when an observation is made by the observation method described above, the ratio of the area occupied by the penetrating members to area occupied by the internal electrodes is 3% or less in terms of stable retention of electrostatic capacitance acquired.

When this invention is directed to the laminated ceramic capacitor 11 illustrated in FIG. 1 as described above, the ceramic layers 13 are made of a dielectric ceramic. However, this invention may be applied to, not only laminated ceramic capacitors, but also inductors, thermistors, piezoelectric components, etc. Therefore, depending on the function of the laminated ceramic electronic component, the ceramic layers may include, in addition to a dielectric ceramic, a magnetic ceramic, a semiconductor ceramic, a piezoelectric ceramic, etc.

In addition, while the laminated ceramic capacitor 11 illustrated in FIG. 1 is a two-terminal capacitor including the two external terminals 18 and 19, this invention can also be applied to multi-terminal laminated ceramic electronic components.

An experimental example will be described below which was carried out for confirming the advantageous effects of this invention.

(A) Preparation of Ceramic Raw Material Powder

A $BaCO_3$ powder and a $TiO_2$ powder were prepared, and these powders were weighed for a Ba/Ti ratio by weight of 1.001, and then subjected to a wet mixing and grinding treatment in a mill using $ZrO_2$ balls. After drying, a $BaTiO_3$ powder with an average grain size of 0.20 μm was prepared by heating to a temperature of 900° C. or more.

With respect to 100 parts by mol of this $BaTiO_3$ powder, 0.6 parts by mol of $Dy_2O_3$, 1.2 parts by mol of $MgCO_3$, 0.2 parts by mol of $MnCO_2$, and 1.0 part by mol of $BaCO_3$ were each added thereto as a powder, furthermore, 0.7 parts by mol of $SiO_2$ sol was added thereto in terms of $SiO_2$, and a mixing and grinding treatment was then carried out in a ball mill using $ZrO_2$ balls, thereby preparing a ceramic raw material powder.

(B) Preparation of Conductive Paste for Internal Electrode

The conductive paste for internal electrodes according to Samples 1 to 3 and 6 shown in Table 1 was prepared as follows.

A mixture obtained by adding terpineol to the $BaTiO_3$ powder of 0.2 μm in average particle size, prepared in the process of step "(A) Preparation of Ceramic Raw Material Powder" was subjected to a dispersing and mixing treatment in a ball mill using $ZrO_2$ balls to obtain a ceramic slurry.

Then, a Ni powder of 0.25 μm in average particle size was prepared, and the Ni powder and the ceramic slurry were mixed so that $BaTiO_3$ in the ceramic slurry was 10 parts by weight with respect to 100 parts by weight of the Ni powder, further mixed with an organic vehicle (ethyl cellulose/terpineol=1/9 (ratio by weight)) and terpineol, and subjected to a dispersing and mixing treatment with the use of a triple roll mill to prepare a conductive paste for internal electrodes according to Samples 1 to 3 and 6 with "Yes" for "Ceramic Addition to Internal Electrodes" as shown in Table 1.

On the other hand, a conductive paste for internal electrodes according to Samples 4 and 5 with "No" for "Ceramic Addition to Internal Electrodes" as shown in Table 1 was prepared by mixing a Ni powder of 0.25 μm in average particle size, an organic vehicle (ethyl cellulose/terpineol=1/9 (ratio by weight)), and terpineol, and subjected to a dispersing and mixing treatment with the use of a triple roll mill.

(C) Preparation of Laminated Ceramic Capacitor

To the ceramic raw material powder prepared in step "(A) Preparation of Ceramic Raw Material Powder" were added a polybutyral-based binder and a plasticizer and further added toluene ethyl alcohol, and the resultant was subjected to a dispersing and mixing treatment in a ball mill using $ZrO_2$ balls, thereby making a slurry, and the obtained slurry was formed into sheets with the use of a gravure coater, thereby providing green sheets.

Then, the conductive paste for internal electrodes, prepared in step "(B) Preparation of Conductive Paste", was applied by screen printing on the green sheets to form conductive paste films to serve as internal electrodes. Then, 350 of the green sheets with the conductive paste films formed were stacked so as to alternate the sides to which the conductive paste films were drawn, and furthermore, so as to sandwich these sheets, just a predetermined number of green sheets for outer layer sections where no conductive paste films formed were stacked, to prepare a laminate block. This laminate block was cut into pieces to have a planar size of 2.0 mm×1.25 mm after densification by sintering, thereby providing a plurality of unfired laminated bodies.

The unfired laminated bodies thus obtained were subjected to a heat treatment at a temperature of 280° C. in an $N_2$ stream to burn and remove the binder. For Samples 1 to 4, the binder was burned and removed in a $N_2$—$H_2$—$H_2O$ stream until reaching 1000 ppm or less in terms of carbon.

Then, for Samples 1 to 4, the temperature was increased up to the maximum temperature of 1220° C. in $N_2$ at the average rate of temperature increase shown in the column "Rate of Temperature Increase" of Table 1, and without keeping at this temperature, a cooling step was immediately carried forward. For Samples 5 and 6, in a $N_2$—$H_2$—$H_2O$ stream, as shown in the column "Rate of Temperature Increase" of Table 1, the temperature was increased up to 1220° C. at the average rate of temperature increase of 10° C./min, and kept for 1 hour under the condition for an oxygen partial pressure of $10^{-9.6}$ MPa in this case, and a cooling step was then carried forward.

For the sintered laminated bodies thus obtained, external electrodes were formed on end surfaces with the internal electrodes drawn thereto. More specifically, a conductive paste containing copper as its main constituent was applied, and subjected to baking at 800° C. to form base layers, and Ni plating films and Sn plating films were formed thereon by wet plating.

Laminated ceramic capacitors according to each sample were obtained in the way described above. The ceramic layer between the internal electrodes in the obtained laminated ceramic capacitors was about 2 μm in thickness.

(D) Evaluation (1) Formation State of Columnar Member in Internal Electrode

A cross section of the laminated body in the laminated ceramic capacitor was exposed by polishing with resin fixation, the internal electrodes at the surface layer of the cross section were eluted and removed by chemical etching, and the formation state of columnar members was observed with a scanning electron microscope (SEM). For the observation, the internal electrodes were removed by etching as described above, because the existence of the internal electrodes on the polished cross section allows only the columnar members located on the polished cross section to be observed, thereby making it hard to observe the formation state of columnar members at the entire interfaces between the ceramic layers and the internal electrodes.

The observation results are shown in the column "Column Formation State in Internal Electrode" of Table 1. The term the presence or absence of crack generation was evaluated by metallographic observation. This evaluation was made for hundred samples to calculate the ratio of the number of samples cracked. The results are shown in the column "Single Test" in "Incidence of Cracking in Thermal Shock Test" of Table 1.

In addition, the thermal shock test was repeated five times while interposing a step of cooling for 10 minutes therebetween, and in the same way, the presence or absence of crack generation was then evaluated by metallographic observation to calculate the ratio of samples cracked among the hundred samples. The results are shown in the column "Continuous Five Tests" in "Incidence of Cracking in Thermal Shock Test" of Table 1.

TABLE 1

| Sample Number | Ceramic Addition to Internal Electrodes | Rate of Temperature Increase | Column Formation State in Internal Electrode | Incidence of Delamination/ Cracking after Firing | Electrostatic Capacitance (μF) | Incidence of Cracking in Thermal Shock Test (%) | |
|---|---|---|---|---|---|---|---|
| | | | | | | Single Test | Continuous Five Tests |
| 1 | Yes | 40° C./sec | Non Penetrating | 0 | 10.2 | 0 | 0 |
| 2 | Yes | 100° C./sec | Non Penetrating | 0 | 10.6 | 0 | 0 |
| 3 | Yes | 270° C./sec | Non Penetrating | 0 | 10.0 | 0 | 0 |
| 4 | No | 40° C./sec | No Formation | 0 | 10.4 | 0 | 3 |
| 5 | No | 10° C./min | No Formation | 75 | 10.1 | 100 | Not Executed |
| 6 | Yes | 10° C./min | Penetrating | 0 | 7.5 | 0 | 0 |

"Non Penetrating" indicates that columnar members were formed not to penetrate in the thickness direction of the internal electrodes, the term "Penetrating" indicates that columnar members (penetrating members) were formed to penetrate in the thickness direction of the internal electrodes, and the term "No Formation" indicates that no columnar members were formed.

Figure 4:
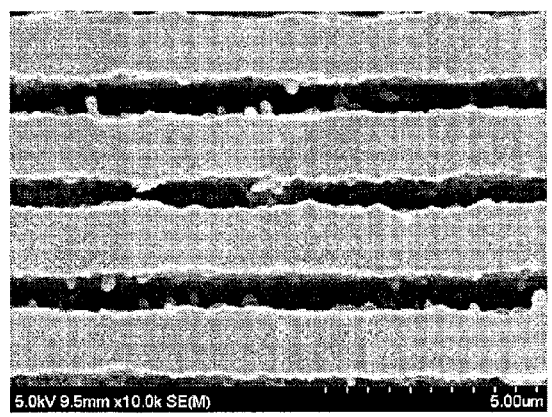
FIG. 4 is a diagram showing a SEM observation image obtained by shooting a cross section of a laminated ceramic capacitor according to sample 1 prepared in an experimental example.
Figure 5:
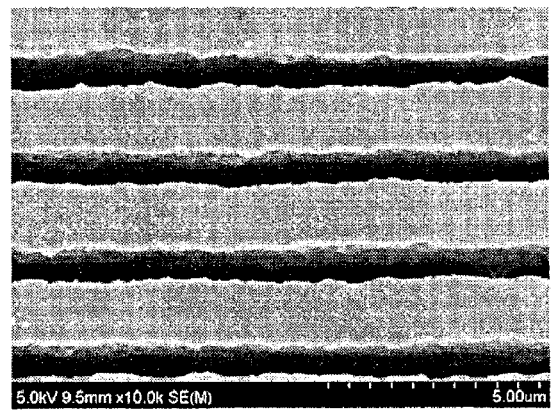
FIG. 5 is a diagram showing a SEM observation image obtained by shooting a cross section of a laminated ceramic capacitor according to sample 4 prepared in the experimental example.
Figure 6:
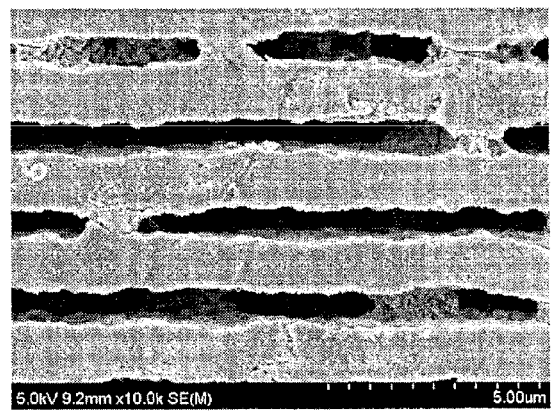
FIG. 6 is a diagram showing a SEM observation image obtained by shooting a cross section of a laminated ceramic capacitor according to sample 6 prepared in the experimental example.
Figure 7:
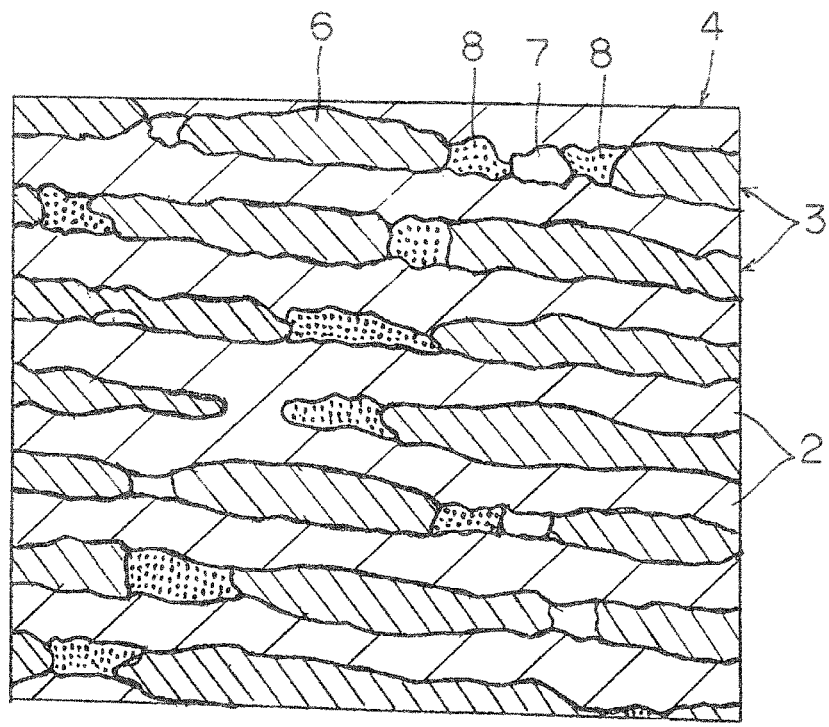
FIG. 7 is a cross-sectional view schematically illustrating enlarged internal electrodes of a laminated ceramic capacitor disclosed in Patent Document 1.

In addition, as typical examples, the SEM observation images for Samples 1, 4, and 6 are shown respectively in FIGS. 4, 5, and 6.

(2) Incidence of Delamination/Cracking

The appearances of the laminated ceramic capacitors were observed by metallographic observation to evaluate the presence or absence of crack generation. Furthermore, cross sections of the laminated bodies in the laminated ceramic capacitors were exposed by polishing with resin fixation to evaluate the presence or absence of delamination and/or cracking generated.

The evaluation described above was made for hundred samples to calculate the ratio of the number of samples delaminated and/or cracked. The results are shown in the column "Incidence of Delamination/Cracking after Firing" of Table 1.

(3) Electrostatic Capacitance

With the use of an LCR meter, the electrostatic capacitance was measured under the conditions of 120 Hz and 0.5 Vrms for the laminated ceramic capacitors according to each sample. Table 1 shows average values for hundred laminated ceramic capacitors in the column "Electrostatic Capacitance" of Table 1.

(4) Thermal Shock Test

A thermal shock test was carried out in which the laminated ceramic capacitors according to each sample were immersed in a solder bath at a temperature of 325° C. for 2 seconds, and As can be seen from Table 1 and FIG. 4, Samples 1 to 3 subjected to firing at the rate of temperature increase of 40° C./second or more through the use of the conductive paste for internal electrodes with the ceramic powder added thereto had columnar members formed not to penetrate in the thickness direction of the internal electrodes, and had no delamination and/or cracking generated after the firing, thereby succeeding in acquiring high electrostatic capacitance. In addition, there was no crack generated in the thermal shock test.

In contrast to these samples, as shown in Table 1 and FIG. 5, Sample 4 subjected to firing at the rate of temperature increase of 40° C./second or more through the use of the conductive paste for internal electrodes with no ceramic powder added thereto succeeded in acquiring high electrostatic capacitance, but failed to have any columnar members formed in the internal electrodes. In addition, in the thermal shock test, cracking was generated in the "Continuous Five Tests".

In addition, as shown in Table 1, sample 5 subjected to firing at the rate of temperature increase less than 40° C./second through the use of the conductive paste for internal electrodes with no ceramic powder added thereto succeeded in acquiring high electrostatic capacitance, but failed to have any columnar members formed in the internal electrodes, and resulted in many samples delaminated and/or cracked after the firing, and also 100% of the samples cracked in the thermal shock test already in the "Single Test".

As shown in Table 1 and FIG. 6, Sample 6 subjected to firing at the rate of temperature increase less than 40° C./second through the use of the conductive paste for internal electrodes with the ceramic powder added thereto had columnar members formed in the internal electrodes, which were penetrating members penetrating in the thickness direction of the internal electrodes. Therefore, there was no delamination and/or cracking generated after the firing, or no crack generated in the thermal shock test, but a decrease in electrostatic capacitance.

DESCRIPTION OF REFERENCE SYMBOLS 11 laminated ceramic capacitor
12, 31 laminated body
13, 33, 34 ceramic layer
14, 15 internal electrode
20, 21, 39 interface
22, 23, 36 columnar member
32 polished cross section
35 internal electrode track
37 base end
38 tip

The invention claimed is:

1. A laminated ceramic electronic component comprising:
a laminated body having a plurality of stacked ceramic layers and internal electrode layers between the ceramic layers,
wherein the internal electrode layers have a plurality of ceramic columnar members contained therein, the columnar members having base ends located at an interface between the ceramic layers and the internal electrode layers, and having tips located within the internal electrode layers, and
when an observation is made with the use of an electron microscope while focusing on a polished cross section of the laminated body in a stacking direction, with the internal electrode layers exposed at the cross section and then dissolved and removed by chemical etching,
(1) the columnar members have the base ends joined with the ceramic layers, and have the tips located in a range of 20% or more and 90% or less of a thickness of the internal electrode layers,
(2) the columnar members have a width of 0.8 μm or less in 50% or more from the base end to the tip, and
(3) the columnar members are present at a rate of one or more per 10 μm in length of the internal electrode layers.

2. The laminated ceramic electronic component according to claim 1, further comprising ceramic penetrating members penetrating through the internal electrode layers, and a ratio of an area occupied by the penetrating members to an area occupied by the internal electrode layers is 3% or less.

3. The laminated ceramic electronic component according to claim 2, wherein a main constituent of the columnar members and a main constituent of the ceramic layers are a barium titanate-based compound.

4. The laminated ceramic electronic component according to claim 2, wherein a main constituent of the internal electrode layers is nickel.

5. The laminated ceramic electronic component according to claim 1, wherein a main constituent of the columnar members and a main constituent of the ceramic layers are a barium titanate-based compound.

6. The laminated ceramic electronic component according to claim 5, wherein a main constituent of the internal electrode layers is nickel.

7. The laminated ceramic electronic component according to claim 1, wherein a main constituent of the internal electrode layers is nickel.

8. The laminated ceramic electronic component according to claim 1, wherein the columnar members have a width of 500 nm or less from the base end to the tip.

9. The laminated ceramic electronic component according to claim 1, wherein the internal electrode layers include a first plurality of internal electrode layers exposed at a first side of the laminated body, and a second plurality of internal electrode layers exposed at a second side of the laminated body, the laminated ceramic component further comprising:
a first external electrode at the first surface of the laminated body and electrically connected to the first plurality of internal electrode layers; and
a second external electrode at the second surface of the laminated body and electrically connected to the second plurality of internal electrode layers.

10. A method for manufacturing a laminated ceramic electronic component, the method comprising:
preparing an unfired laminated body including a plurality of stacked unfired ceramic layers and conductive paste films to serve as internal electrodes, which are located between the unfired ceramic layers; and
sintering the unfired laminated body,
wherein the conductive paste films contain a ceramic powder, and
the sintering step includes carrying out a heat treatment in accordance with a temperature profile at an average rate of temperature increase of 40° C./sec or more from room temperature to a maximum temperature.

11. The method for manufacturing a laminated ceramic electronic component according to claim 10, wherein the ceramic powder has an average particle size of 0.2 μm or less.

12. The method for manufacturing a laminated ceramic electronic component according to claim 11, wherein a main constituent of the ceramic powder is a barium titanate-based compound.

13. The method for manufacturing a laminated ceramic electronic component according to claim 10, wherein the average rate of temperature increase is 100° C./sec or more.

14. The method for manufacturing a laminated ceramic electronic component according to claim 10, wherein a main constituent of the ceramic powder and a main constituent of the unfired ceramic layers are a barium titanate-based compound.

15. The method for manufacturing a laminated ceramic electronic component according to claim 14, wherein a main constituent of the conductive paste films is nickel.

16. The method for manufacturing a laminated ceramic electronic component according to claim 10, wherein a main constituent of the conductive paste films is nickel.

* * * * *